Oct. 20, 1953 D. P. GROVER 2,655,676
ROTARY TOOTHBRUSH WITH LIP GUARD
Filed Oct. 24, 1946 3 Sheets-Sheet 1
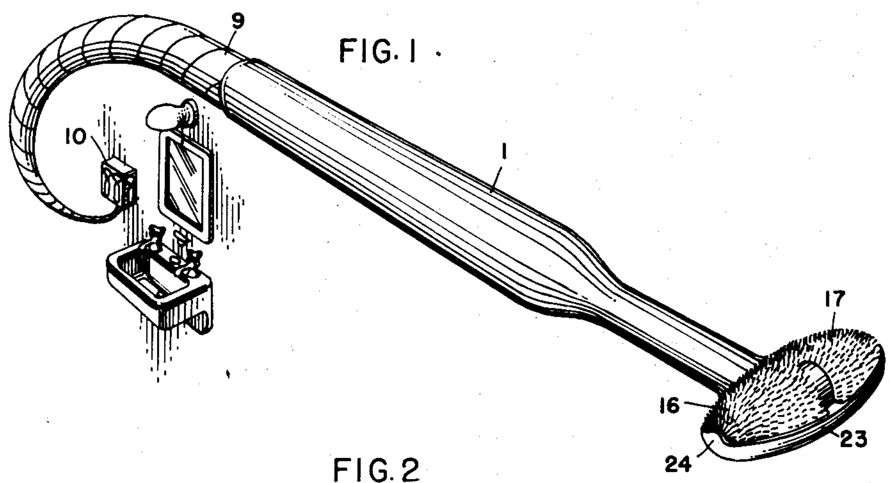
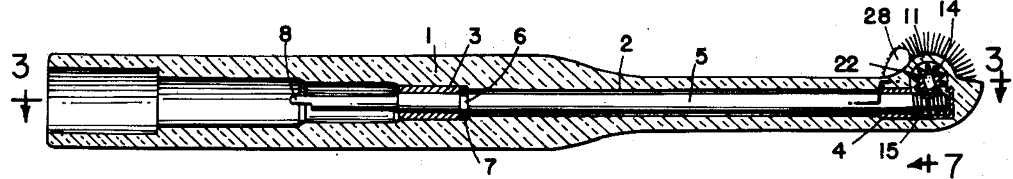
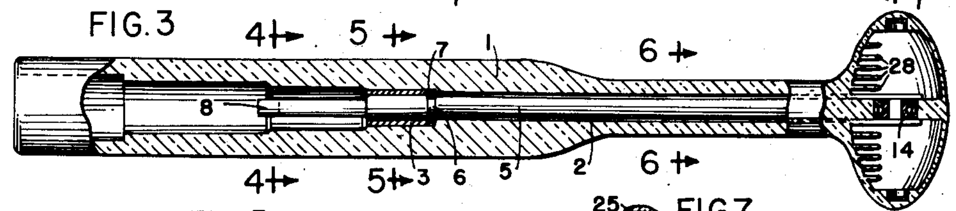
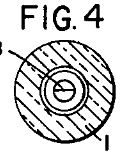
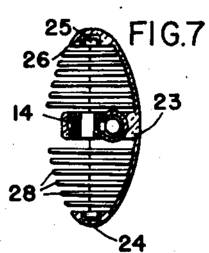
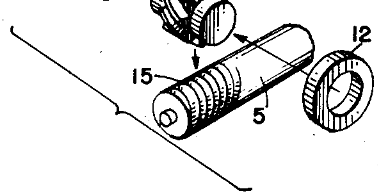
*INVENTOR:*
DONALD P. GROVER
*BY*
Spencer, Johnston, Cook & Root.
ATT'YS Oct. 20, 1953 D. P. GROVER 2,655,676
ROTARY TOOTHBRUSH WITH LIP GUARD
Filed Oct. 24, 1946 3 Sheets-Sheet 2
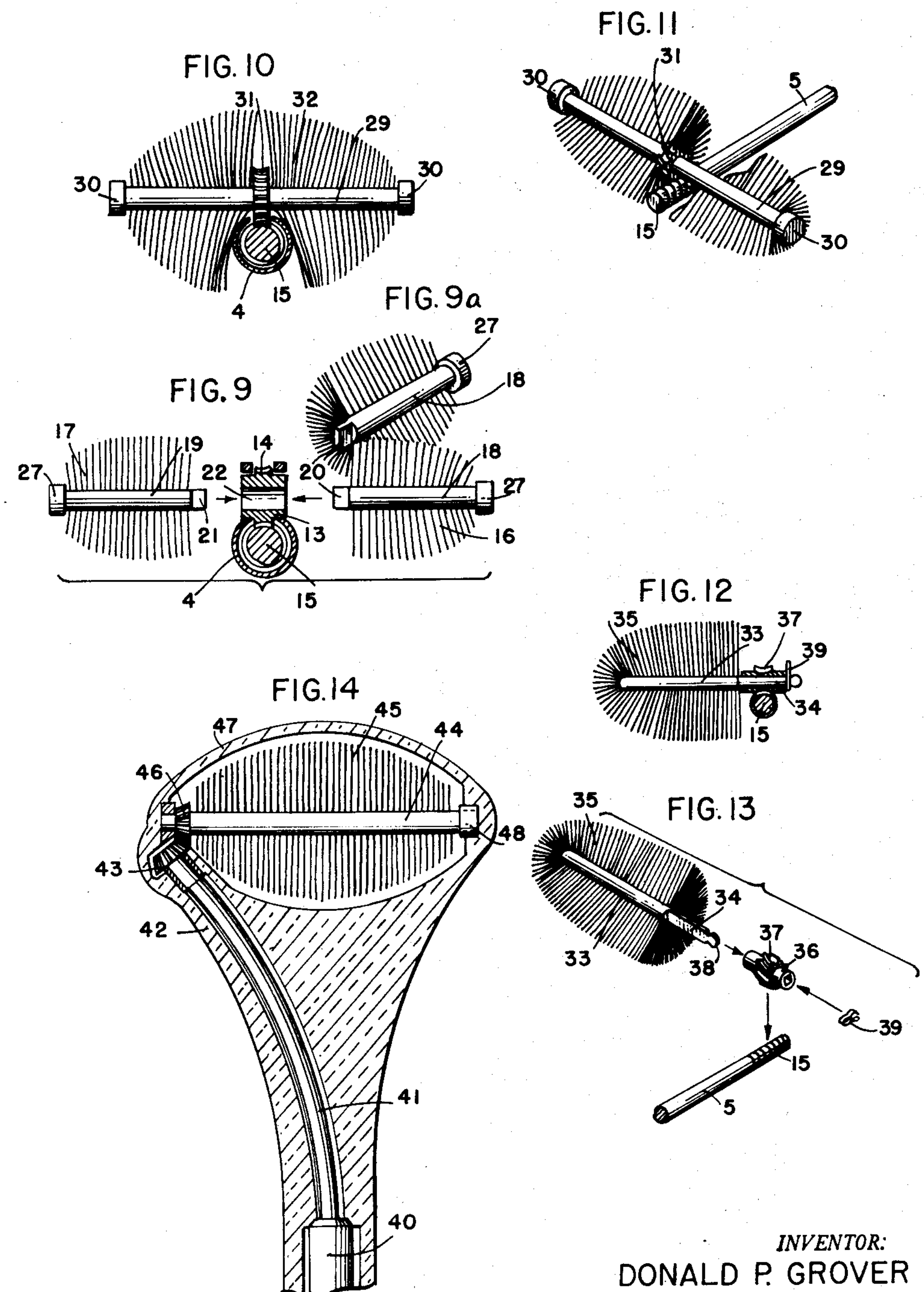
INVENTOR:
DONALD P. GROVER
BY
Spencer Johnston, Cook & Root
ATT'YS Oct. 20, 1953 D. P. GROVER 2,655,676
ROTARY TOOTHBRUSH WITH LIP GUARD
Filed Oct. 24, 1946 3 Sheets-Sheet 3
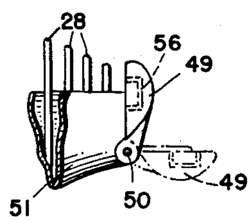
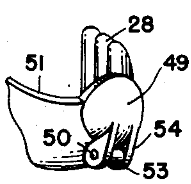
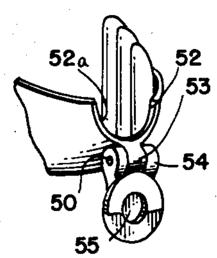
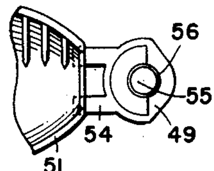
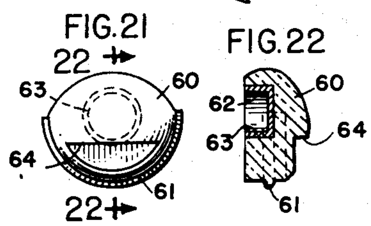
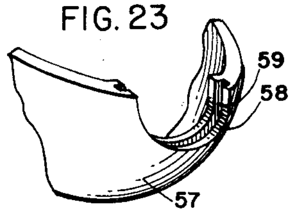
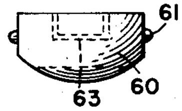
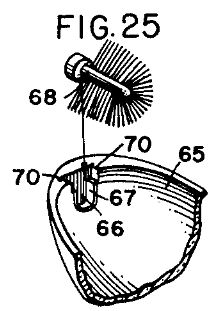
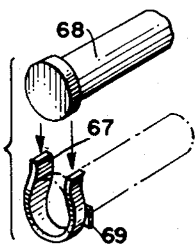
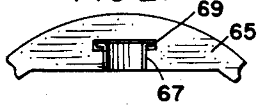
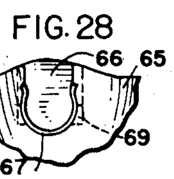
FIG. 20 61 60 64
*INVENTOR:*
DONALD P. GROVER
*BY*
Spencer, Johnston, Cook & Root.
ATT'YS Patented Oct. 20, 1953 2,655,676

UNITED STATES PATENT OFFICE 2,655,676

ROTARY TOOTHBRUSH WITH LIP GUARD

Donald P. Grover, Chicago, Ill.

Application October 24, 1946, Serial No. 705,282

4 Claims. (Cl. 15—23)

1

This invention relates in general to rotary toothbrushes and particularly to the type which may be used by individuals at home as distinguished from those in professional use by dentists.

There have been attempts in the past to produce a satisfactory rotary toothbrush for home use where the brush element is rotated by mechanical or electrical means. In the early development of such devices it was discovered that the bristles of the rotating brush would contact the soft, tender and fleshy portions, such as the inside of the cheek of a user, thus irritating these portions and causing lacerations. This was especially true when the inner sides of the teeth were being cleaned. A further objection occurred in cleaning the outer sides of the teeth by reason of the contact with the lip of a user with the bristles of the brush element which would also result in irritation and possible laceration thereof.

It was also discovered that, in the absence of any preventive means, the rotation of the brush would cause the toothpaste or other cleaning agent on the brush to be thrown outwardly and splattered about. These objections and disadvantages led to the later development of mounting the brush element in a shield which would prevent the splattering of the toothpaste and at the same time would protect the inner soft portions of the mouth against contact by the rotating brush when the inner sides of the teeth were being cleaned. This innovation, however, did not overcome all of the earlier disadvantages because it was then discovered that the lip of a user would be drawn inwardly by the rotating brush element and would be drawn between the bristles of the brush and the edge of the shield. The resulting irritation and laceration to the lip was found to be exceedingly unpleasant by the user and has been said to be one of the main reasons for the lack of popularity and of commercial success of the earlier rotary toothbrushes.

I have disclosed in my earlier filed co-pending applications, Serial Nos. 691,273; 691,979; 692,270, filed August 17, 1946; August 21, 1946; and August 22, 1946, now Patent Nos. 2,533,106, 2,533,107, and 2,533,108, respectively, various forms of lip guards which I have devised for the purpose of overcoming these earlier objections. In these co-pending applications the disclosures have been primarily directed to brush elements which were located in substantial parallelism with the handle portion of the toothbrush to be grasped by a user. It will, nevertheless, be evident that any of the

2 forms of lip guards as disclosed therein may be applied with equal advantage to any other form of rotary toothbrush, such as those disclosed herein, where the brush element is disposed at an angle, and preferably at right angles, with respect to the handle portion.

I have also disclosed in my earlier filed co-pending applications Serial No. 700,315 filed September 30, 1946, and Serial No. 702,535, filed October 10, 1946, forms of rotary toothbrushes with multiple heads, or more than one brush element whereby the inner and outer sides of the teeth may be cleaned simultaneously.

A further objection to the rotary toothbrushes of the prior art has been the necessity of providing a reversing mechanism in order to rotate the brush element in either of two directions. It is common knowledge that all dentists advise the cleaning of teeth away from the gums. That is to say, the cleaning movement of the brush should begin at or near the gum tissue and move toward the biting surface of the teeth. In the absence of any means for reversing the rotation of the brush element, it would obviously rotate in the same direction at all times, thus making it necessary in some instances for the teeth to be brushed toward the gums rather than away therefrom.

One of the principal advantages in locating the brush element at an angle with respect to the handle portion, and particularly transversely thereof, is the ability to conveniently manipulate the handle so that the brush element will always brush the teeth away from the gums while rotating in the same direction, thus avoiding any necessity for a reversing mechanism.

One of the principal objects of the present invention is to provide a rotary toothbrush wherein the brush element thereof is disposed at an angle with respect to the handle portion to avoid the necessity for a reversing mechanism.

A further object of the invention is to provide a rotary toothbrush with novel mounting means whereby the brush element thereof may easily be removed for cleaning or replacement purposes.

Still another object is to provide a rotary toothbrush wherein a brush element is removably mounted in supporting means adjacent one end of a handle portion so that the brush element is disposed at an angle with respect thereto.

A still further object is to provide a rotary toothbrush wherein supporting means in the form of a shield are provided which extend transversely of the handle portion and novel retaining means are located in each end of the shield for removably mounting the brush element therein.

Another and more specific object of the invention is to provide novel driving means for rotating the brush element of a rotary toothbrush.

Other objects and advantages of the invention will become apparent upon reading the following description taken in connection with the accompanying drawings in which:

Fig. 1 is a perspective view of one form of the invention showing a flexible shaft for driving the brush element connected to a source of rotational movement, such as an electric motor unit, in a bathroom;

Fig. 2 is a vertical longitudinal section taken substantially through the center of the handle and head of the device of Fig. 1;

Fig. 3 is a horizontal longitudinal section taken through the device shown in Fig. 2 with the brush removed;

Fig. 4 is a vertical transverse section taken substantially along the plane of line 4—4 of Fig. 3;

Fig. 5 is a vertical transverse section taken substantially along the plane of line 5—5 of Fig. 3;

Fig. 6 is a vertical transverse section taken substantially along the plane of line 6—6 of Fig. 3;

Fig. 7 is a vertical transverse section taken substantially along the plane of line 7—7 of Fig. 3;

Fig. 8 is a fragmentary exploded perspective view of the various parts making up the driving means between the shaft and the brush element;

Fig. 9 is an exploded view similar to Fig. 8 but showing the driving means in vertical section;

Fig. 9*a* is a perspective view of one of the brush elements removed from the driving means to show the driving lug on the end of the shaft;

Fig. 10 is an end elevational view of a modified form of brush element showing the driving means in vertical section;

Fig. 11 is a perspective view of the form of device shown in Fig. 10;

Fig. 12 is an end elevation of a further modified form of brush element showing the driving means in vertical section;

Fig. 13 is an exploded view in perspective of the device shown in Fig. 12;

Fig. 14 is a plan view of a modified form of driving means and brush element;

Fig. 15 is a fragmentary end elevational view of the shield showing one form of mounting means for the brush element;

Fig. 16 is a fragmentary perspective view of the device shown in Fig. 15;

Fig. 17 is a fragmentary perspective view similar to Fig. 16 but showing the supporting means for the brush element in its inoperative position;

Fig. 18 is a fragmentary plan view of the device shown in Fig. 15 with the supporting means in open or inoperative position;

Fig. 19 is a fragmentary plan view of the junction between the bearing cap and the shield, showing how the cap snaps into place;

Fig. 20 is a perspective view of a modified form of supporting means for the brush element;

Fig. 21 is an end elevation of the supporting means shown in Fig. 20;

Fig. 22 is a vertical section taken substantially along the plane of line 22—22 of Fig. 21;

Fig. 23 is a fragmentary perspective view of one end of the shield as it is constructed to receive the supporting means shown in Fig. 20;

Fig. 24 is a top plan view of the supporting means shown in Fig. 20;

Fig. 25 is a fragmentary perspective view of one end of the shield showing a further modified form of retaining or supporting means and showing the brush element removed therefrom;

Fig. 26 is an exploded view in perspective of the spring retainer used in connection with the supporting means shown in Fig. 25 and with the spindle of the brush element removed therefrom;

Fig. 27 is a fragmentary top plan view of the device shown in Fig. 25; and

Fig. 28 is a fragmentary end elevation looking toward the inner end of the shield as shown in Fig. 25.

Referring now more particularly to the drawings and more especially to that form of the invention disclosed in Figs. 1 through 9*a*, the rotary toothbrush of the present invention comprises a handle portion 1 which is of a suitable size to be grasped by the hand of a user and which is preferably formed of a plastic or other non-conducting material. An elongated opening 2 extends within the handle portion 1 and is adapted for the purpose of receiving a suitable driving means. A bearing 3 is adapted to be located within the first enlarged portion adjacent the opening 2 and another bearing 4 is located at the opposite end of the opening 2 whereby a shaft 5 may be rotatably mounted therein.

An annular groove 6 is located in the shaft 5 a short distance from one end thereof which receives a retaining ring 7 to thus prevent any longitudinal movement of the shaft. The inner end of the shaft 5 may be provided with any suitable connecting means such as the offset portion 8 adapted to be connected to one end of a flexible shaft 9 of a suitable construction to be connected to a source of rotary movement such as the electric motor 10 whereby rotation of the shaft 5 will take place. Flexible shafts of this nature are well known to those skilled in the art and further specific description thereof is not necessary at the present time.

In this form of the invention the forward end of the handle portion 1 is provided with a narrow enlarged portion 11 adapted to receive the bearing members 12 which rotatably support the hubs 13 of a worm gear 14 (see Figs. 3 and 9). The outer end of the shaft 5 has a worm section 15 adapted to be in mesh with the worm gear 14 so that rotation of the shaft will cause a rotation of the gear 14.

Brush elements 16 and 17 are provided with spindles 18 and 19 which have at one end a transversely extending rib as indicated at 20 and 21, whereby these ribs may be received within suitable openings 22 in the hubs 13 of the worm gear 14. Thus rotation of the gear which has been induced by rotation of the shaft will cause a rotation of the brush elements when suitably mounted.

Any suitable supporting means for the outer ends of the spindles of the brush elements may be used for removably mounting such brush elements. In the present case I prefer the supporting means to be a part of the shield 23. This shield may either be integral with or suitably secured to the handle portion and in the preferred form of the invention will extend transversely thereof as shown. The shield is preferably in the form of a hollow shell having the ends 24 whereby the inner sides of each end may be provided with a recess 25 adapted to have a bearing member of suitable form 26 located therein. The outer ends 27 of each of the spindles 18 and 19 are adapted to be received within the bearing members 26 and thus rotatably support the brush elements.

While it is not necessary, but highly desirable, the supporting means should be of such a character as to permit the brush elements to be removed therefrom for replacement and cleaning. The removable feature of this invention may take any one of numerous forms and preferably one of those disclosed in Figs. 15 through 28 which will be described more fully hereinafter. It will thus be seen that the present invention as disclosed in Figs. 1 through 9*a*, illustrates the use of two brush elements adapted to be located one on each side of the central driving gear 14 so that rotation of the main shaft 5, through its worm section 15 and the worm gear 14, will drive and cause a rotative movement of the brush elements 16 and 17. In all forms of the invention as hereinabove pointed out, it is highly desirable that some form of lip guard be provided such as the teeth or partitions 28. These lip guards need not necessarily be teeth, the form disclosed herein, but may assume any of the forms disclosed in any of my co-pending applications referred to above.

The modified form of brush element and drive means as disclosed in Figs. 10 and 11 illustrate the use of a single brush element having a spindle 29 with ends 30 thereon adapted to be supported within the bearings 26 as above described. The spindle 29 may be provided with a centrally disposed worm gear 31 adapted to mesh with the worm section 15 on the shaft 5 and will have the usual bristles 32 connected therewith to thus form the completed brush element. In this form of the invention the enlarged bearing section 11 of the handle portion may be omitted since the worm gear 31 is a part of the brush element and will be removed with the brush element for cleaning or replacement purposes.

Referring now to Figs. 12 and 13, a further modified form of the invention is disclosed wherein the spindle and brush element extend outwardly from one side only of the handle portion. In this case the spindle 33 is provided with an elongated substantially flat extension 34 at one end thereof and will have the bristles 35 secured thereto to form the brush element. The flat end of the spindle is adapted to be received within a suitable opening located in the hubs 36 of the worm gear 37. The outer end of the section 34 has a pair of opposing detents 38 adapted to receive a spring clip 39 which may be placed over the end of the spindle after it is in place within the worm gear as shown in Fig. 12. In this form of the invention, the shield or other supporting means will extend from one side only of the handle portion. In this form, however, it will be unnecessary for the shield to be provided with a retaining bearing because the bearing surface between the flat shank 34 and the inner surface of the gear 37 and hubs 36 will be sufficient in itself to support the brush element. When in place, the worm gear 37 will be in mesh with the worm section 15 on the end of the shaft 5, whereby rotation of the shaft will thus impart a rotative movement to the brush element.

Fig. 14 discloses a slightly modified form of the invention shown in Figs. 12 and 13. Here the brush element also extends outwardly at one side only of the handle portion or driving shaft, but is not necessarily located at substantially right angles with respect to the shaft, and the specific driving means used is also different. The handle portion 40 is provided with a flexible shaft 41 which is adapted to curve outwardly within a suitable supporting means 42 and may have a bevel gear 43 mounted at the outer end thereof so that when the flexible shaft 41 rotates, it will impart a rotative motion to the gear 43.

The spindle 44 will have the usual bristles 45 thereon to form the brush element, but one end of the spindle 44 will have the bevel gear 46 secured thereto and adapted to be in mesh with the gear 43. Suitable supporting means 47 are provided to removably support the ends 48 of the spindle 44 in the usual manner. Thus it will be evident that any rotative movement of the shaft will impart a similar rotative movement to the brush element 45. In any of the forms of the invention illustrated and described, it will be evident that suitable lip guards may be provided to protect the lips of a user against irritation and lacerations.

Referring now more specifically to the various forms of retaining means for the brush element disclosed in Figs. 15 through 28, and any one of which may be used with any of the modified forms of brush elements disclosed in Figs. 1 through 14, one of the preferred forms constitutes a removable end member 49 adapted to be pivotally mounted by means of a pivot pin 50 to the ends of suitable supporting means such as the shield 51. The ends of the shield itself are provided with a recess 52 below which is an enlargement 53 adapted to receive the pivot pin 50. The end member is provided with a pair of spaced apart ears 54 adapted to receive the projection 53 therebetween whereby the pivot pin 50 pivotally supports such end member. The inner side of the end member has a recess 55 adapted to receive a bearing member 56 whereby the ends of the spindle of a brush element may be rotatably mounted therein. The recess 52 is so constructed as to releasably secure the end member 49 therein, so that when the brush element is inserted within the shield and the ends 49 closed thereagainst, they will remain in place to rotatably support the brush element. Fig. 19 discloses a preferred form of releasable connection where it will be seen that the edge 52*a* of the opening 52 is inclined outwardly a small amount so that when the cap or closure 49 is placed therein, the edge 52*a* will yield slightly and then return to the position shown. When it is desired to remove the brush element, it is merely necessary to exert an outward pressure on the end members 49 which will release the spindle for removal. It will be evident that such a construction need not necessarily be located at both ends of the shield or supporting means, location thereof at one end only being ordinarily sufficient.

The form of retaining means disclosed in Figs. 20 through 23 contemplates a shield or supporting means 57 having a recess 58 in one or both ends thereof, which recess has a groove 59 between the sides thereof. The removable end member 60 is in substantially the form of a disc having a rib 61 around the outer edge and lower side thereof. This rib is adapted to be received within the groove 59 to thus secure the member 60 in place. The inner side of the member 60 has a recess 62 with a bearing member 63 therein for the purpose of receiving one end of the spindle of a brush element whereby the brush element will be rotatably mounted therein.

For ease in removing the supporting member 60 for purposes of removing the brush element, a downwardly extending ledge 64 may be provided on the outer side of the member 60 whereby upward pressure, as by means of a finger nail, will remove the supporting member and carry with it the spindle, thus facilitating removal of the brush element.

The shield or supporting means 65 of the modified form of retaining means shown in Figs. 25 through 28 has a closed outer end, but the inner side thereof has a downwardly extending recess 66 of a suitable form to receive a spring clip 67. The bottom of the recess 66 and the lower side of the spring clip 67 are circular so as to rotatably receive a spindle 68 of a brush element. The spring clip 67 is retained within the recess by means of ears 69 extending outwardly from each side thereof and which are adapted to be received within transversely extending slots 70 at the inner side of the recess 66. Thus the spring retaining clip 67 is held in place within the recess, and in turn rotatably supports the end of the spindle 68 therein whereby rotation of the brush element is permitted, but removal thereof is facilitated by exerting an upward pressure on the brush element sufficient to overcome the tension of the retainer 67.

As stated above, it is highly desirable in rotary toothbrushes of this character to provide some means for removing the brush element either for replacement or cleaning purposes. While several forms of brush elements and driving means have been illustrated herein, it will be clear that any form thereof may be used in combination with any of the releasable supporting means disclosed in Figs. 15 through 28. Likewise, any of the preferred forms of the releasable supporting means disclosed herein may be adapted for use with any of the brush elements as disclosed in Figs. 1 through 14.

From the foregoing description it will be evident that I have provided a novel form of rotary toothbrush wherein the brush element is positioned at an angle with respect to the handle portion and the driving shaft therein, and is particularly positioned transversely with respect thereto. Furthermore, I have disclosed novel means for releasably supporting the various forms of brush elements to facilitate removal thereof. It will be evident that changes may be made in the form, construction and arrangement of parts from those disclosed herein without departing from the spirit of the invention or sacrificing any of the attendant advantages thereof, provided, however, that such changes fall within the scope of such claims appended hereto.

Having thus described my invention what I claim as new and desire to secure by Letters Patent of the United States is:

1. A rotary toothbrush of the character described comprising a handle portion, a shaft extending longitudinally through said handle portion, brush supporting means formed at one end of said handle portion, a brush element including a spindle extending longitudinally therethrough, means in said brush supporting means to removably and rotatably mount said spindle angularly with respect to said handle portion, gear means connecting said shaft with said spindle, whereby rotation of said shaft will rotate said spindle and brush, and guard means for the lip of a user disposed along one side of said brush supporting means and extending between the bristles on said brush element.

2. The combination of elements defined in claim 1, wherein said guard means is disposed along the side of the brush supporting means toward which said brush element rotates.

3. The combination of elements defined in claim 1, wherein said guard means includes a plurality of fin-like teeth spaced apart along the length of a side of said brush supporting means.

4. A rotary toothbrush of the character described comprising a handle portion, a shaft extending longitudinally through said handle portion, brush supporting means formed at one end of said handle portion, a brush element including a spindle extending longitudinally therethrough, means in said brush supporting means to rotatably mount said spindle angularly with respect to said handle portion, drive means connecting said shaft with said spindle, whereby rotation of said shaft will rotate said spindle and brush, and guard means for the lip of a user disposed along one side of said brush supporting means and extending between the bristles on said brush element.

DONALD P. GROVER.

References Cited in the file of this patent

UNITED STATES PATENTS

| Number | Name | Date |
|---|---|---|
| 1,091,314 | Erickson | Mar. 24, 1914 |
| 1,430,033 | Smerschnik | Sept. 26, 1922 |
| 1,555,522 | Shapiro | Sept. 29, 1925 |
| 1,576,196 | Kemmis | Mar. 9, 1926 |
| 1,578,495 | Zave | Mar. 30, 1926 |
| 1,593,803 | McDonald | July 27, 1926 |
| 1,743,898 | McCauley | Jan. 14, 1930 |
| 1,922,238 | Freed | Aug. 15, 1933 |
| 1,927,566 | Hawk | Sept. 19, 1933 |
| 1,951,851 | Turner | Mar. 20, 1934 |
| 1,965,885 | Dyer | July 10, 1934 |
| 2,057,499 | Nystrom | Oct. 13, 1936 |
| 2,215,031 | Elmore | Sept. 17, 1940 |
| 2,250,975 | Sussman | July 29, 1941 |
| 2,400,723 | Vrana | May 21, 1946 |

FOREIGN PATENTS

| Number | Country | Date |
|---|---|---|
| 168,085 | Switzerland | Mar. 31, 1934 |
| 913,810 | France | June 3, 1946 |